United States Patent
Smirnov et al.

(10) Patent No.: US 12,283,422 B2
(45) Date of Patent: Apr. 22, 2025

(54) CONTROL SYSTEM FOR CONTROLLING A MAGNETIC SUSPENSION SYSTEM

(71) Applicant: SpinDrive Oy, Lappeenranta (FI)

(72) Inventors: Alexander Smirnov, Lappeenranta (FI); Nikita Uzhegov, Lappeenranta (FI)

(73) Assignee: SPINDRIVE OY, Lappeenranta (FI)

( * ) Notice: Subject to any disclaimer, the term of this patent is extended or adjusted under 35 U.S.C. 154(b) by 216 days.

(21) Appl. No.: 17/921,873

(22) PCT Filed: Apr. 1, 2021

(86) PCT No.: PCT/FI2021/050244
§ 371 (c)(1),
(2) Date: Oct. 27, 2022

(87) PCT Pub. No.: WO2021/219927
PCT Pub. Date: Nov. 4, 2021

(65) Prior Publication Data
US 2023/0207176 A1    Jun. 29, 2023

(30) Foreign Application Priority Data
Apr. 28, 2020    (FI) ................................. 20205433

(51) Int. Cl.
*H02K 7/09*    (2006.01)
*F16C 32/04*    (2006.01)
*H01F 7/20*    (2006.01)

(52) U.S. Cl.
CPC ......... *H01F 7/206* (2013.01); *F16C 32/0451* (2013.01); *F16C 32/0459* (2013.01); *H02K 7/09* (2013.01)

(58) Field of Classification Search
CPC .. H01F 7/206; F16C 32/0451; F16C 32/0459; F16C 32/0457; F16C 32/0444;
(Continued)

(56) References Cited

U.S. PATENT DOCUMENTS 6,351,048 B1    2/2002    Schob et al.
6,779,759 B1    8/2004    Klupar et al.
(Continued)

FOREIGN PATENT DOCUMENTS

EP    1 912 312    4/2008
KR    10-2017-0115647    10/2017

OTHER PUBLICATIONS

International Search Report and Written Opinion of the ISA dated Jul. 13, 2021, for PCT/FI2021/050244, 12 pp.
(Continued)

*Primary Examiner* — Danny Nguyen
(74) *Attorney, Agent, or Firm* — NIXON & VANDERHYE

(57) ABSTRACT

A control system for controlling a magnetic suspension system includes controllers each being configured to control one or more of magnetic actuators magnetically levitating an object. One of the controllers is configured to operate as a master controller and other one or ones of the controllers are configured to operate as one or more slave controllers. The master controller is communicatively connected with one or more digital data transfer links to the one or more slave controllers and configured to control operation of the one or more slave controllers. The control system makes it possible to implement a centralized control with separate controllers, and thereby without a need for a controller having a high number of controller current sources.

17 Claims, 4 Drawing Sheets

(58) Field of Classification Search
CPC ......... F16C 32/048; H02K 7/09; B60L 13/04;
G05B 1/02; F04B 17/03
USPC ........................................ 361/139, 143, 144
See application file for complete search history.

(56) References Cited

U.S. PATENT DOCUMENTS

| | | |
|---|---|---|
| 2004/0135034 A1 | 7/2004 | Abel et al. |
| 2004/0251753 A1 | 12/2004 | Wingett et al. |
| 2005/0035744 A1 | 2/2005 | Potter et al. |
| 2005/0082928 A1 | 4/2005 | Giles et al. |
| 2014/0303779 A1* | 10/2014 | Zhu ........................ G05B 15/02 |
| | | 700/275 |
| 2017/0356264 A1* | 12/2017 | Corneliussen ...... F16C 32/0442 |

OTHER PUBLICATIONS

Finnish Search Report dated Dec. 28, 2020, for FI Application No. 20205433, 2 pp.
K. H. Jang et al., "Redundancy Performance of Levitation Controller for Maglev Vehicle EcoBee", $21^{st}$ International Conference on Electrical Machines and Systems (ICEMS), Jeju, South Korea: IEEE, Oct. 7, 2018, pp. 898-902.

* cited by examiner

CONTROL SYSTEM FOR CONTROLLING A MAGNETIC SUSPENSION SYSTEM

CROSS-REFERENCE TO RELATED APPLICATION(S)

This application is the U.S. national phase of International Application No. PCT/FI2021/050244 filed Apr. 1, 2021, which designated the U.S. and claims priority to FI 20205433 filed Apr. 28, 2022, the entire contents of each of which are hereby incorporated by reference.

FIELD OF THE DISCLOSURE

The disclosure relates to a control system for controlling a magnetic suspension system that can be, for example but not necessarily, an active magnetic bearing "AMB" system. Furthermore, the disclosure relates to a magnetic suspension system.

BACKGROUND

Magnetic suspension systems such as e.g. active magnetic bearing "AMB" systems are commonly used for levitating e.g. rotating or oscillating objects. A typical application is levitation of a rotor of an electrical machine, e.g. a high-speed electrical machine. In many cases, the levitation is accomplished by balancing attractive forces of oppositely acting magnets and other forces acting on an object to be levitated, where at least one of the magnets is a controllable electromagnet. In principle, it is also possible to balance an attractive force of one controllable electromagnet with other forces, e.g. the gravity force, acting against the attractive force of the electromagnet. There are several different kinds of magnetic suspension systems. Some systems use permanent magnet material to generate bias magnetic fluxes, while others use direct biasing currents to generate the bias magnetic fluxes. The biasing is used to linearize the operation of the system and to improve control dynamics of the system.

Magnetic forces acting in degrees of freedom of a levitated object, e.g. a rotor of an electrical machine, need to be controlled actively because of inherent instability of the magnetic levitation. The instability is caused by the fact that a magnetic attractive force acting between a magnet and an object made of e.g. ferromagnetic material increases when an airgap between the magnet and the object gets smaller. In a typical active magnetic bearing system, there are five degrees of freedom to be controlled and thus ten controller current sources are needed. All of them should be operated in a centralized manner to provide a good controllability of the AMB system and to take into account couplings between different degrees of freedom.

There are AMB systems with longer shafts where additional bearings are necessary to provide reliable levitation. Each radial bearing requires four controller current sources, thus rapidly increasing the total amount of the controller current sources. Thus, in an AMB system of the kind mentioned above, a control system needs to have a high number of controller current sources to provide magnetic levitation. The challenge related to the high number of controller current sources has been solved either by modifying the power electronics to provide more controller current sources, which requires additional development and reduces cost efficiency. Alternatively, a decentralized approach has been utilized when different bearings are operated independently, in which case controllability and stability of magnetic levitation may be reduced.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the invention, there is provided a new control system for controlling a magnetic suspension system that can be, for example but not necessarily, an active magnetic bearing "AMB" system for levitating a rotating element such as e.g. a rotor of an electrical machine.

A control system according to the invention comprises controllers each of which is configured to control one or more of magnetic actuators of a magnetic suspension system for magnetically levitating an object. One of the controllers is configured to operate as a master controller and other one or ones of the controllers are configured to operate as one or more slave controllers. The master controller is communicatively connected with one or more digital data transfer links to the one or more slave controllers, wherein digital data transferred via the one or more digital data transfer links is indicative of reference values of electric currents of coils of the magnetic actuators, the master controller being configured to control operation of the one or more slave controllers.

The control system according to the invention makes it possible to implement a centralized control with separate controllers and thereby without a need for a controller having a high number of controller current sources.

In accordance with the invention, there is provided also a new magnetic suspension system that comprises:
 magnetic actuators configured to magnetically levitate an object,
 a position sensor system for generating position signals indicative of a position of the object with respect to a reference position of the object, and
 a control system according to the invention for controlling electric currents of coils of the magnetic actuators based on the position signals.

Exemplifying and non-limiting embodiments are described in accompanied dependent claims.

Various exemplifying and non-limiting embodiments both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of unrecited features.

The features recited in dependent claims are mutually freely combinable unless otherwise explicitly stated.

Furthermore, it is to be understood that the use of "a" or "an", i.e. a singular form, throughout this document does not exclude a plurality.

BRIEF DESCRIPTION OF THE FIGURES

Exemplifying and non-limiting embodiments and their advantages are explained in greater detail below in the sense of examples and with reference to the accompanying drawings, in which.

DESCRIPTION OF EXEMPLIFYING AND NON-LIMITING EMBODIMENTS

The specific examples provided in the description below should not be construed as limiting the scope and/or the applicability of the accompanied claims. Lists and groups of examples provided in the description are not exhaustive unless otherwise explicitly stated.

Figure 1A:
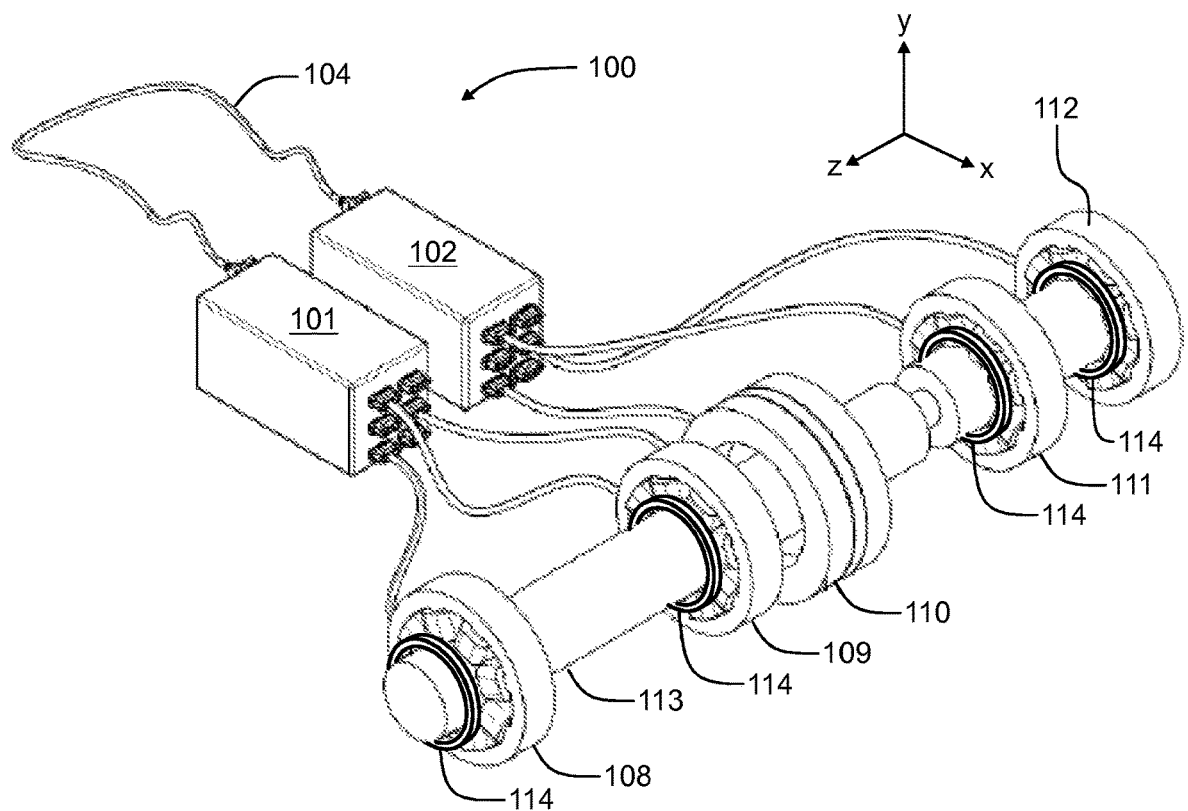
FIGS. 1a and 1b illustrate a magnetic suspension system that comprises a control system according to an exemplifying and non-limiting embodiment.

FIG. 1a shows a magnetic suspension system that comprises a control system 100 according to an exemplifying and non-limiting embodiment. The magnetic suspension system comprises magnetic actuators 108, 109, 110, 111, and 112 configured to magnetically levitate an object 113. In this exemplifying case, the magnetic suspension system is an active magnetic bearing "AMB" system and the object 113 is a rotating element that can be e.g. a rotor of an electrical machine. The magnetic actuators 108, 109, 111, and 112 are radial magnetic bearings, and the magnetic actuator 110 is an axial magnetic bearing.

The magnetic suspension system comprises a position sensor system 114 for generating position signals indicative of a position of the object 113 with respect to a reference position of the object. The position sensor system 114 may comprise for example inductive sensors where the inductance of each inductive sensor is dependent on a distance from the inductive sensor under consideration to a surface of the object 113. It is also possible that a position sensor system comprises means for forming the position signals based on differences between the inductances of the coils of the magnetic actuators 108-112. The inductance of each coil can be estimated based on e.g. the rate of change of electric current di/dt when the voltage directed to the coil under consideration is changed in a stepwise manner. In this exemplifying case, there is no need for separate position sensors.

The control system 100 is configured to control electric currents of the coils of the magnetic actuators 108-112 based on the above-mentioned position signals. The control system 100 comprises controllers 101 and 102 each of which is configured to control corresponding ones of the magnetic actuators for magnetically levitating the object 113. One of the controllers 101 and 102 is configured to operate as a master controller and other one of the controllers is configured to operate as a slave controller. The master controller is communicatively connected with a digital data transfer link 104 to the slave controller, and the master controller is configured to control operation of the slave controller. Thus, it is possible to implement a centralized control with the separate controllers 101 and 102 and thereby without a need for a controller having a high number of controller current sources. In an exemplifying embodiment, the digital data transferred between the controllers 101 and 102 is indicative of reference values of the electric currents of the coils of the magnetic actuators, and the controllers 101 and 102 are configured to use the digital data to coordinate the operation of the controllers 101 and 102 so that for example situations where two or more of the magnetic actuators act against each other can be avoided. In another exemplifying embodiment, all computations related to the magnetic levitation are carried out by the master controller and the one or more slave controllers are used only as controllable current sources that are controlled by reference values received from the master controller via digital data transfer links.

Figure 1B:
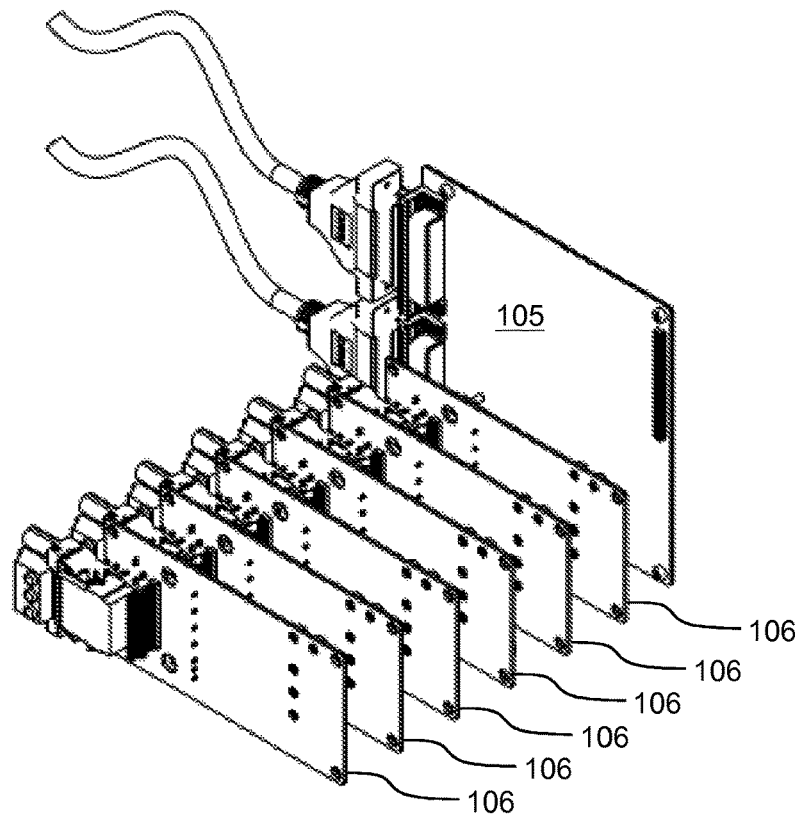

In a controller system according to an exemplifying and non-limiting embodiment, each of the controllers comprises a control board that is configured to carry out computations related to the magnetic levitation. Furthermore, each of the controllers comprises replaceable power boards each of which is configured to supply electric current in accordance with a control signal received from the control board. In FIG. 1b, the control board is denoted with a reference 105 and the replaceable power boards are denoted with a reference 106. The above-described arrangement makes it possible to adapt each controller to different requirements by variating the number and current ratings of the replaceable power boards.

The control board 105 shown in FIG. 1b may comprise one or more processor circuits each of which can be a programmable processor circuit provided with appropriate software, a dedicated hardware processor such as for example an application specific integrated circuit "ASIC", or a configurable hardware processor such as for example a field programmable gate array "FPGA". Furthermore, the control board 105 may comprise one or more memory devices such as e.g. random-access memory "RAM" devices. Each of the replaceable power boards 106 may comprise e.g. transistors configured to constitute e.g. a full-H bridge or a half-H bridge and driver circuits for driving the transistors.

Figure 2:
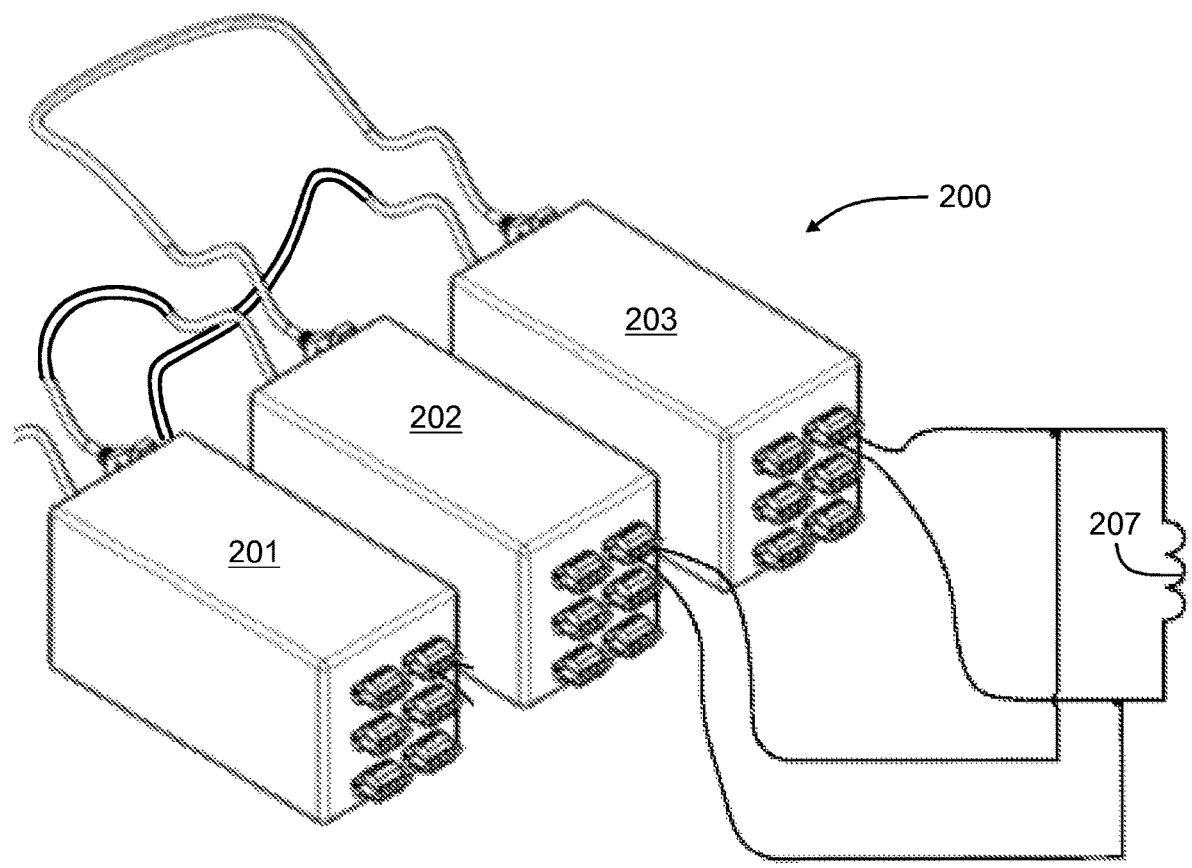
FIG. 2 illustrates a part of a magnetic suspension system that comprises a control system according to an exemplifying and non-limiting embodiment.

FIG. 2 illustrates a part of a magnetic suspension system that comprises a control system 200 according to an exemplifying and non-limiting embodiment. The control system comprises controllers 201, 202, and 203 for controlling magnetic actuators, e.g. active magnetic bearings, of the magnetic suspension system. In this exemplifying case, the controllers 202 and 203 are connected to a same coil 207 of the magnetic actuators. This arrangement provides redundancy and thereby improves reliability. One of the controllers 201, 202, and 203 acts as a master controller that is configured to select which one of the controllers 202 and 203 is used for supply electric current to the coil 207. In an exemplifying embodiment, the master controller is configured to compare one or more quantities related to operation of each of the controllers 202 and 203 to admissible ranges of the one or more quantities, and to select one of these controllers 202 and 203 based at least partly on the comparisons. The one or more quantities related to the operation of each controller may comprise for example measured electric currents, reference values of the electric currents, direct "DC" voltages of the controller, position estimates of a levitated object, and/or temperatures measured in the controller. In an exemplifying embodiment, three or more controllers are connected to a same coil and these controllers are configured to produce reference values for electric current of the coil, and a master controller is configured to select one of these controllers based on majority of the reference values so that the reference value produced by the selected one of the controllers belongs to the majority of the reference values.

Figure 3A:
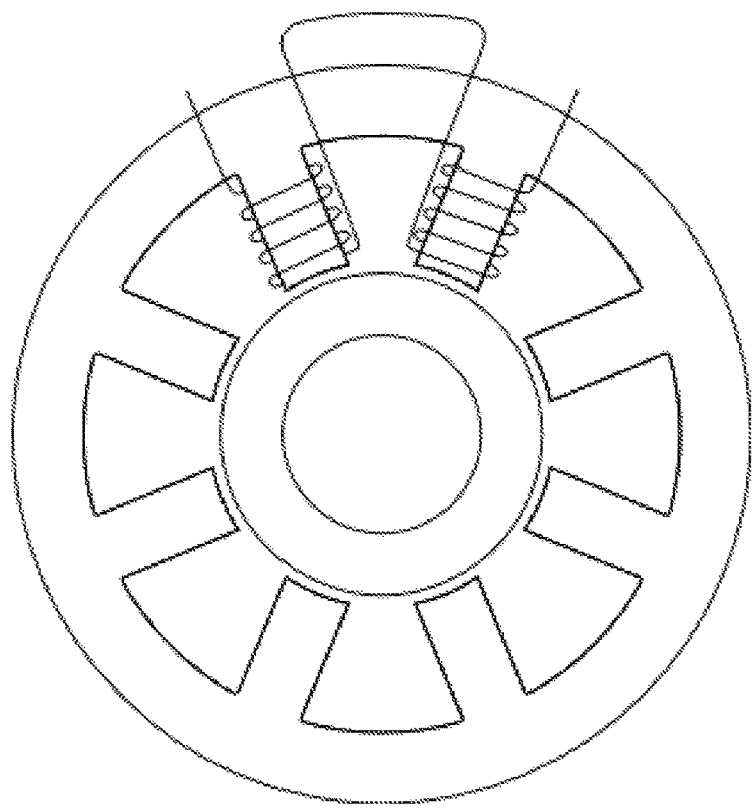
FIGS. 3a, 3b, 3c, and 3d illustrate exemplifying winding arrangements of magnetic actuators that are controllable with control systems according to exemplifying and non-limiting embodiments.
Figure 3B:
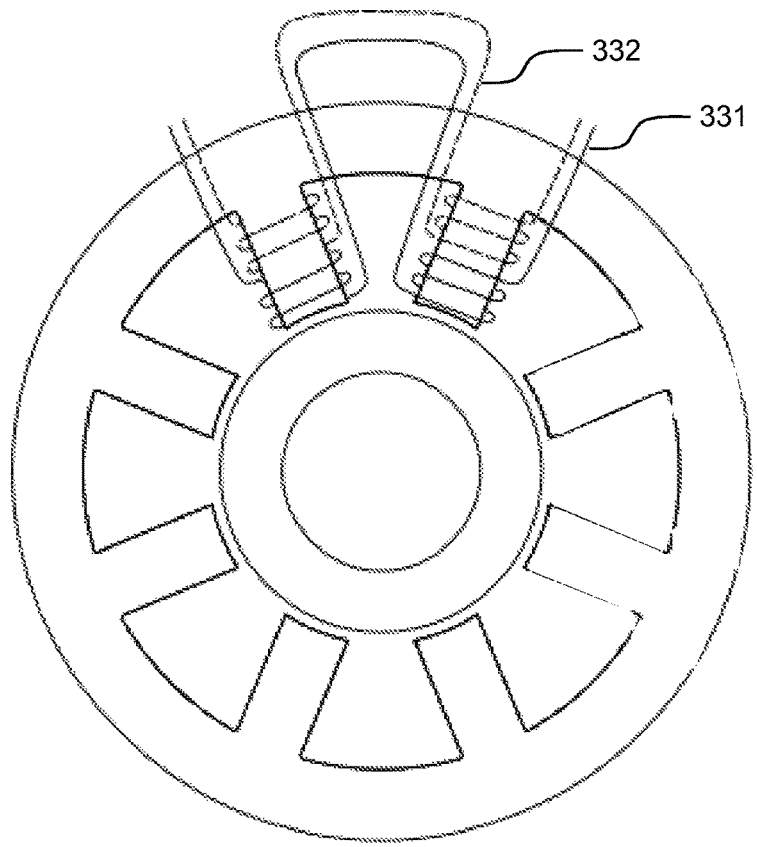
Figure 3C:
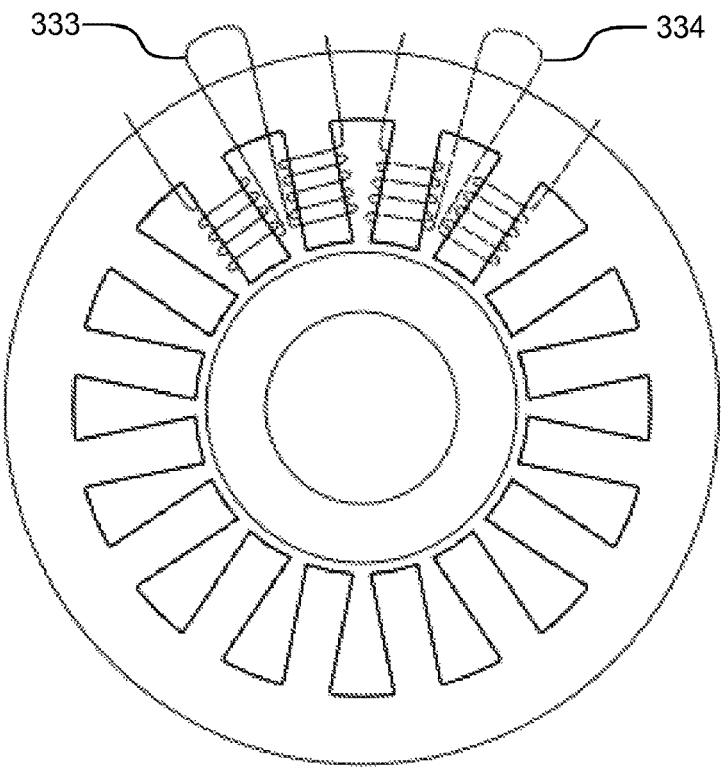
Figure 3D:
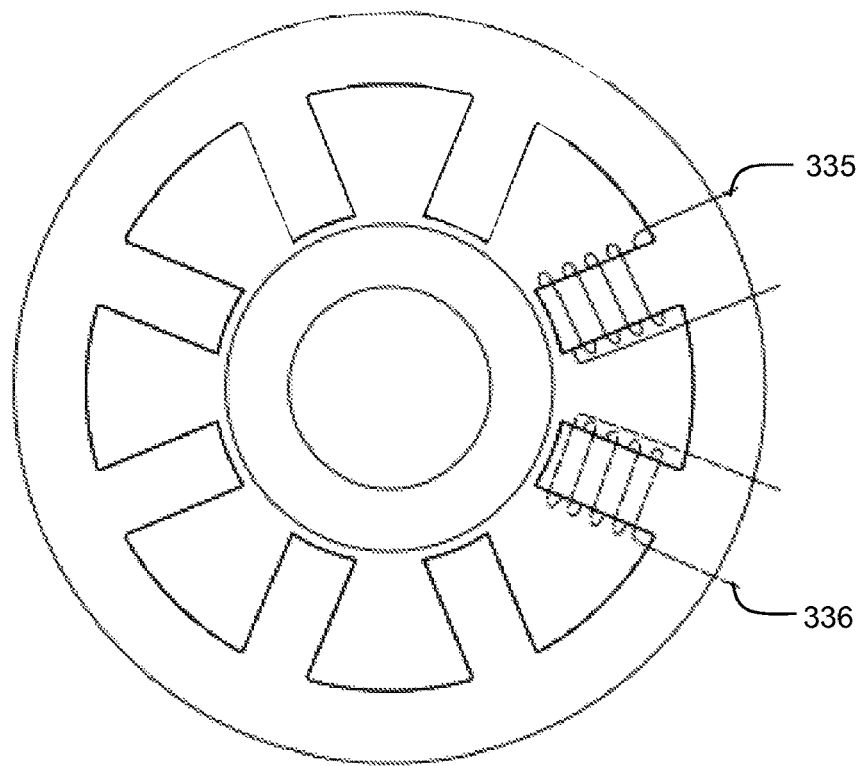

FIGS. 3a, 3b, 3c, and 3d illustrate exemplifying winding arrangements of magnetic actuators that are controllable with control systems according to exemplifying and non-limiting embodiments. FIG. 3a illustrates an exemplifying winding arrangement where each electromagnet pole-pair is supplied with one controller current source. FIG. 3b illustrates an exemplifying winding arrangement where each electromagnet pole-pair is provided with two windings supplied with different controller current sources. The controller current sources belong advantageously to different controllers e.g. to improve redundancy. FIG. 3b shows two exemplifying windings 331 and 332 arranged to magnetize a same electromagnet pole-pair. The winding 331 depicted with a solid line can be supplied with a first controller, and the winding 332 depicted with a dashed line can be supplied with a second controller. FIG. 3c illustrates an exemplifying arrangement where there are more than one set of electromagnets for implementing a control in desired degrees of freedom, i.e. in mutually perpendicular directions in the figure plane of FIG. 3c. FIG. 3c shows two exemplifying windings 333 and 334 arranged to magnetize electromagnets which belong to different ones of the above-mentioned sets. The winding 333 depicted with a solid line can be supplied with a first controller current source, and the winding 334 depicted with a dashed line can be supplied with a second controller current source. The first and second controller current sources belong advantageously to different controllers e.g. to improve redundancy. The possibility to supply electric currents from different controller current sources, which advantageously belong to different controllers, to parallel windings of a given electromagnet pole-pair or to windings of different electromagnets for controlling same degrees of freedom allows to increase the bandwidth of the control because inductances of the windings which are limiting the bandwidth are reduced when the number of controller current sources increases. This allows to operate systems of various sizes by increasing the number of controllers without changing power electronics. FIG. 3d illustrates an exemplifying winding arrangement where each electromagnet pole has a separate winding that can be supplied with a separate controller current source. FIG. 3d shows two exemplifying windings 335 and 336 arranged to magnetize poles of an electromagnet and supplied with different controller current sources.

The specific examples provided in the description given above should not be construed as limiting the scope and/or the applicability of the appended claims. Lists and groups of examples provided in the description given above are not exhaustive unless otherwise explicitly stated.

What is claimed is:

1. A control system for controlling a magnetic suspension system, the control system comprising:
    controllers each being configured to control one or more of magnetic actuators of the magnetic suspension system for magnetically levitating an object,
    wherein one of the controllers is configured to operate as a master controller and other one or ones of the controllers are configured to operate as one or more slave controllers, and the master controller is communicatively connected with one or more digital data transfer links to the one or more slave controllers, wherein digital data transferred via the one or more digital data transfer links is indicative of reference values of electric currents of coils of the magnetic actuators, the master controller being configured to control operation of the one or more slave controllers, and
    wherein each of the controllers comprises a control board configured to carry out computations related to magnetic levitation and replaceable power boards each being configured to supply electric current in accordance with a control signal received from the control board.

2. The control system according to claim 1, wherein two or more of the controllers are connectable to a same coil of the magnetic actuators, and the master controller is configured to select one of the two or more controllers to supply electric current to the same coil.

3. The control system according to claim 2, wherein the master controller is configured to compare one or more quantities related to operation of each of the controllers connected to the same coil to an admissible range of each of the one or more quantities, and to select the one of these controllers based at least partly on comparisons related to these controllers.

4. The control system according to claim 2, wherein the controllers connected to the same coil are configured to produce the reference values for the electric current of the coil, and the master controller is configured to select the one of these controllers based on majority of the reference values so that the reference value produced by the selected one of the controllers belongs to the majority of the reference values.

5. The control system according to claim 1, wherein the master controller is configured to compare one or more quantities related to operation of each of the controllers connected to the same coil to an admissible range of each of the one or more quantities, and to select the one of these controllers based at least partly on comparisons related to these controllers.

6. The control system according to claim 1, wherein the controllers connected to the same coil are configured to produce the reference values for the electric current of the coil, and the master controller is configured to select the one of these controllers based on majority of the reference values so that the reference value produced by the selected one of the controllers belongs to the majority of the reference values.

7. A magnetic suspension system comprising:
    magnetic actuators configured to magnetically levitate an object,
    a position sensor system for generating position signals indicative of a position of the object with respect to a reference position of the object, and
    a control system for controlling electric currents of coils of the magnetic actuators based on the position signals,
    wherein the control system comprises controllers each being configured to control one or more of the magnetic actuators for magnetically levitating the object, wherein one of the controllers is configured to operate as a master controller and other one or ones of the controllers are configured to operate as one or more slave controllers, and the master controller is communicatively connected with one or more digital data transfer links to the one or more slave controllers, wherein digital data transferred via the one or more digital data transfer links is indicative of reference values of electric currents of coils of the magnetic actuators, the master controller being configured to control operation of the one or more slave controllers, and wherein each of the controllers comprises a control board configured to carry out computations related to magnetic levitation and replaceable power boards each being configured to supply electric current in accordance with a control signal received from the control board.

8. The magnetic suspension system according to claim 7, wherein the magnetic actuators comprise radial magnetic bearings.

9. The magnetic suspension system according to claim 7, wherein the magnetic actuators comprise axial magnetic bearings.

10. The magnetic suspension system according to claim 7, wherein two or more of the controllers of the control system are connected to a same coil of the magnetic actuators, and the master controller is configured to select one of the two or more controllers to supply electric current to the same coil.

11. The magnetic suspension system according to claim 7, wherein the magnetic actuators have two or more windings configured to magnetize a same electromagnet pole-pair, and a first one of the controllers of the control system is configured to supply electric current to a first one of the windings and a second one of the controllers of the control system is configured to supply electric current to a second one of the windings.

12. The magnetic suspension system according to claim 7, wherein the magnetic actuators have a first set of electromagnets for implementing a control in predetermined degrees of freedom and a second set electromagnets for implementing a control in the same predetermined degrees of freedom, and a first one of the controllers of the control system is configured to supply electric current to a winding of the first set of electromagnets and a second one of the controllers of the control system is configured to supply electric current to a winding of the second set of electromagnets.

13. The magnetic suspension system according to claim 7, wherein the magnetic actuators have windings each being wound around only a single pole of the magnetic actuators, the windings being supplied with separate controller current sources of the control system.

14. The magnetic suspension system according to claim 8, wherein the magnetic actuators comprise axial magnetic bearings.

15. The magnetic suspension system according to claim 8, wherein two or more of the controllers of the control system are connected to a same coil of the magnetic actuators, and the master controller is configured to select one of the two or more controllers to supply electric current to the same coil.

16. The magnetic suspension system according to claim 9, wherein two or more of the controllers of the control system are connected to a same coil of the magnetic actuators, and the master controller is configured to select one of the two or more controllers to supply electric current to the same coil.

17. The magnetic suspension system according to claim 8, wherein the magnetic actuators have two or more windings configured to magnetize a same electromagnet pole-pair, and a first one of the controllers of the control system is configured to supply electric current to a first one of the windings and a second one of the controllers of the control system is configured to supply electric current to a second one of the windings.

* * * * *